Figure 3:
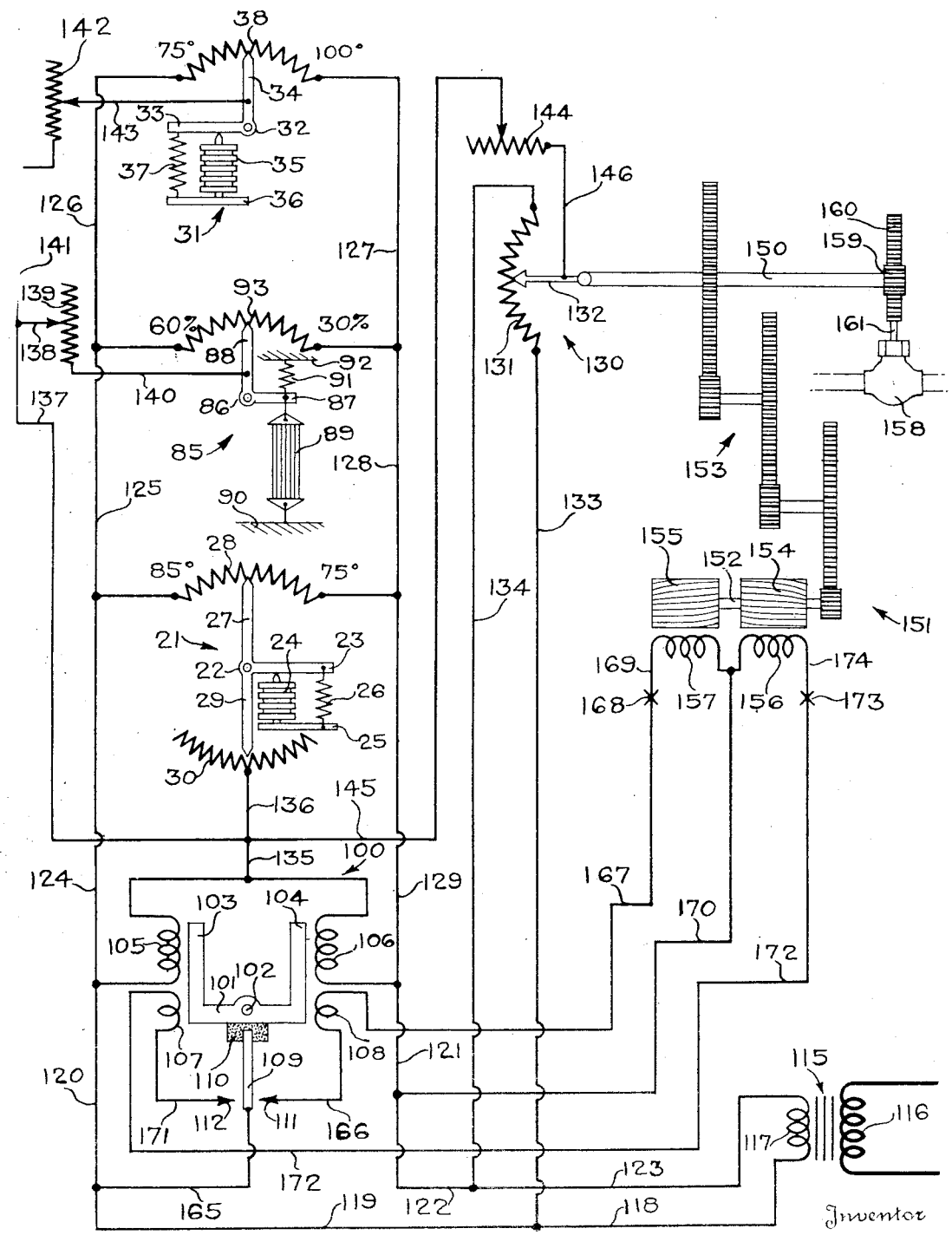

Sept. 19, 1939.                J. E. HAINES                2,173,331
                      COMPENSATING CONTROL SYSTEM
                    Filed Sept. 3, 1935      2 Sheets-Sheet 1
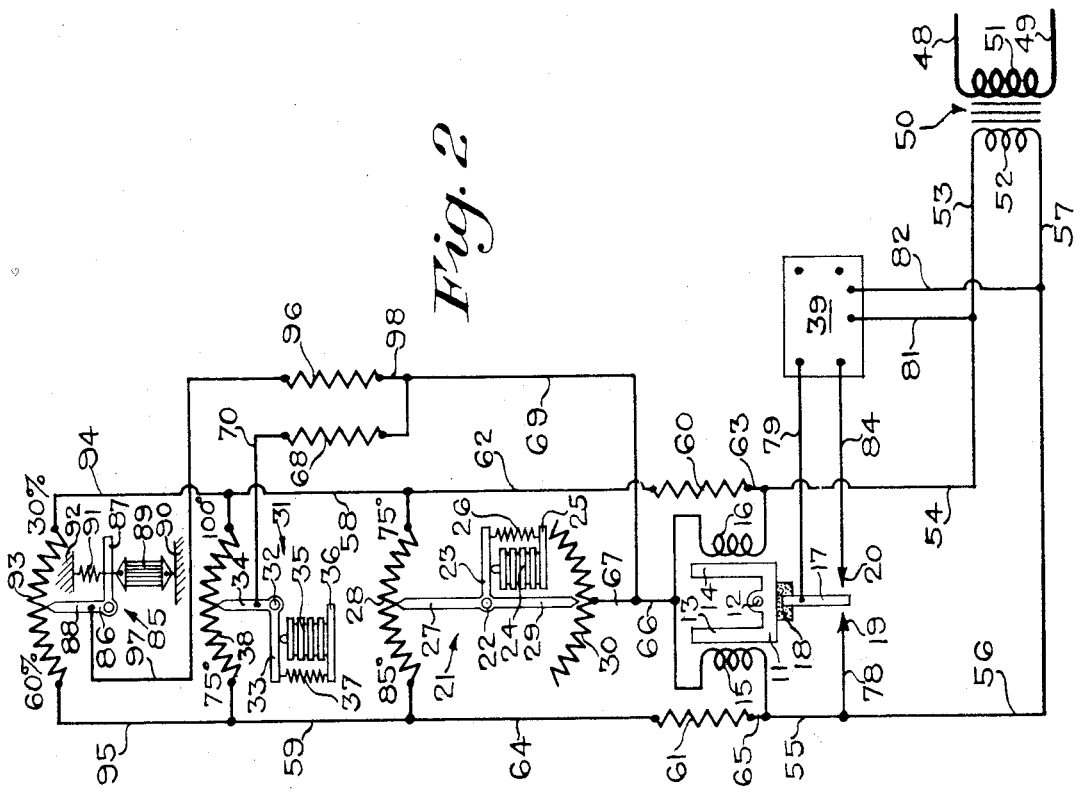
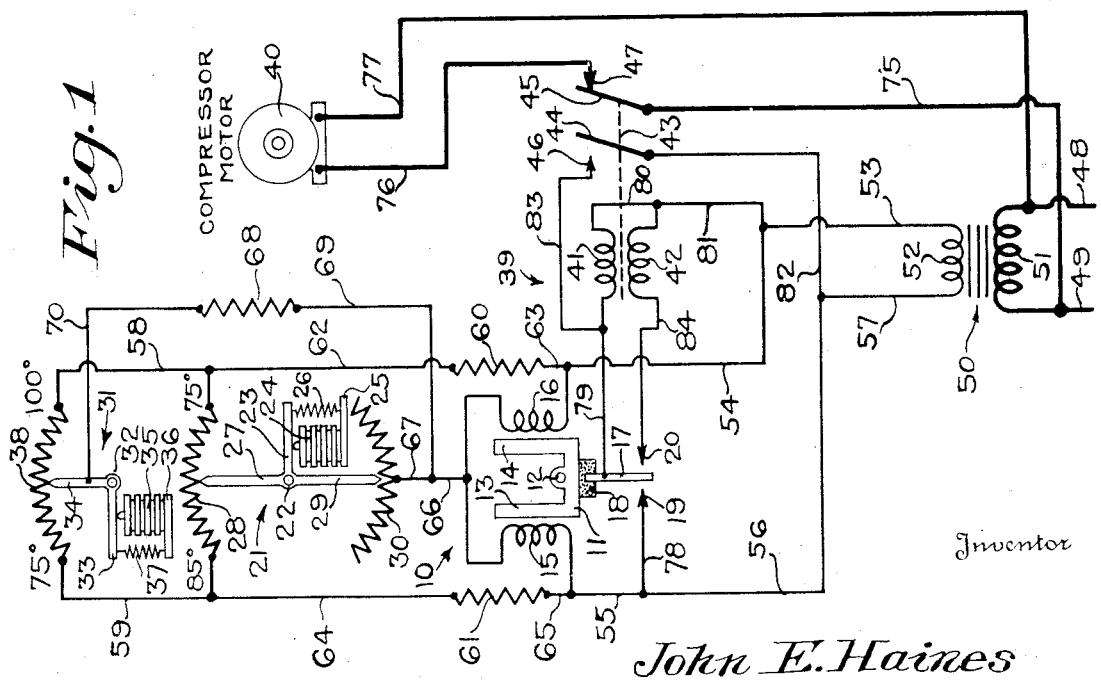
Inventor
John E. Haines
By George H Fisher
Attorney Sept. 19, 1939.     J. E. HAINES     2,173,331

COMPENSATING CONTROL SYSTEM

Filed Sept. 3, 1935     2 Sheets-Sheet 2

Inventor
John E. Haines
By George H Fisher
Attorney

Patented Sept. 19, 1939

2,173,331

UNITED STATES PATENT OFFICE 2,173,331

COMPENSATING CONTROL SYSTEM

John E. Haines, Minneapolis, Minn., assignor to Minneapolis-Honeywell Regulator Company, Minneapolis, Minn., a corporation of Delaware Application September 3, 1935, Serial No. 38,946

14 Claims. (Cl. 236—74)

The present invention relates to electrical systems of control wherein the action of a variable electrical controller upon an electrically controlled mechanism is varied by a variable electrical compensating device or adjusting device and is in part an improvement upon the system disclosed in Lewis L. Cunningham Patent No. 2,101,-808 Dec. 7, 1937.

An object of the present invention is the provision of an electrical control system in which a variable electrical controller operates to control an electrical mechanism and in which there is a variable electrical adjusting mechanism electrically connected to the controller and electrical mechanism in a manner to vary the effect of the controller on the electrical mechanism, the arrangement being such that the controller always maintains dominant control of the electrical mechanism even though the adjusting mechanism be in an extreme position.

Another object of the invention is the provision of means to cause equal movements of a variable electrical controller to result in substantially equal variations in the flow of current to a mechanism controlled thereby whereby, when the controller takes the form of a condition responsive variable resistance, the sensitivity of the system remains substantially constant as the controller varies such resistance from one extreme to another.

A further object of the invention is the provision of an electrical system of control in which a current varying controller having a wide range or total differential operates an electrical mechanism upon operation of the controller over only part of its range, (in other words, the operating differential being smaller than the total differential) and providing means to vary or shift the operating differential within the total differential while maintaining the value of the operating differential substantially constant so that the sensitivity of the system remains substantially constant irrespective of where the operating differential is located in respect to the total differential.

Another object of the invention is the provision of an electrical graduated control system comprising a potentiometer type controller and one or more compensating potentiometers for varying the control action of the control potentiometer, the arrangement being such that the control potentiometer can never entirely lose command of the system even though the compensating potentiometer or potentiometers go to extreme positions.

Another object of the invention is the provision of a graduated electrical control system in which a controller having a wide total differential and a relatively narrow operating differential is arranged so that the operating differential of the controller may be shifted in respect to its total differential while maintaining the operating differential of constant value.

A further object of the invention is the provision of an improved effective temperature control system of the variable resistance type which is more accurate and more perfect in operation than those heretofore proposed.

Another object is the provision of a modulating or graduated effective temperature control system.

Other objects of the invention will be found in the drawings, the detailed description and the claims.

For a better understanding of the invention, reference may be had to the following description and the accompanying drawings, in which:

Fig. 1 is a diagrammatic showing of one form of the invention wherein there is a single compensating device, Fig. 2 is a diagramatic showing of a similar system employing a pair of compensating devices, and Fig. 3 is a diagrammatic showing of a graduated control system employing a pair of compensating devices as well as a single controller.

Referring first to Fig. 1 of the drawings, an electrical mechanism which it is desired to control is indicated generally at 10 and is illustrated as comprising a balanced relay. This balanced relay 10 includes an armature 11, pivoted at 12, and provided with two legs 13 and 14. A relay coil 15 cooperates with the leg 13 and a similar relay coil 16 cooperates with the leg 14. The armature 11 controls a switch arm 17 to which it is connected by means of a block of insulating material 18. This switch arm 17 cooperates with a pair of spaced contacts 19 and 20 between which it is disposed. It will be evident that if both relay coils 15 and 16 are deenergized or are equally energized, the armature 11 will assume the position in which it is shown in Fig. 1 of the drawings wherein switch arm 17 is intermediate contacts 19 and 20 and is disengaged from both of them. It will be further evident that if relay coil 15 is energized sufficiently more highly than the relay coil 16, the armature 11 will be rotated in a clockwise direction so that switch arm 17 moves into engagement with contact 19. Similarly, if the relay coil 16 is energized sufficiently more highly than the relay coil 15, the armature 11 will be rotated in a counter-clockwise direction and switch arm 17 will move into engagement with contact 20.

The respective energizations of relay coils 15 and 16 are adapted to be primarily controlled by a potentiometer type of controller generally indicated at 21. This controller includes a bell-crank 22 that is provided with an arm 23 which is adapted to be positioned by a bellows 24 that has one of its ends abutting the arm 23 and its other end secured to a support 25. The action of bellows 24 is opposed by a coiled spring 26 which has one of its ends secured to the arm 23 and its other end secured to the support 25. In the present form of the invention, the controller 21 takes the form of a temperature controller. The bellows 24 is therefore charged with a suitable vilatile fluid which causes expansion of bellows 24 upon a rise in the temperature to which the same is subjected. The bell-crank 22 further includes an arm 27 which takes the form of a control contact that cooperates with a control resistance 28 and is adapted to sweep thereacross upon predetermined changes in the temperature to which the bellows 24 is subjected. The bell-crank 22 also includes a third arm 29 which is a corrector contact that cooperates with a corrector resistance 30. Both of the contacts 27 and 29 and both of the resistances 28 and 30 operate to vary the respective energizations of the relay coils 15 and 16 in a manner which will be explained hereinafter.

The respective energizations of the relay coils 15 and 16 are also adapted to be controlled by a compensating control or compensator, generally indicated at 31. This compensator 31 includes a bell-crank 32 which is provided with arms 33 and 34. The arm 33 is positioned by a bellows 35 one end of which abuts the arm 33 and the other end of which is secured to a suitable support 36. Expansion of bellows 35 is opposed by a suitable coiled spring 37 which has one of its ends secured to the arm 33 and its other end secured to the support 36. The compensator 31 is also shown herein as responsive to temperature wherefore the bellows 35 is charged with a suitable volatile fluid which expands upon temperature rise and causes arm 34 to rotate in a clockwise direction. The arm 34 takes the form of a compensating contact and its cooperates with an associated compensating resistance 38.

The balanced relay 10 may control any desired type of mechanism and is herein shown as controlling a power-failure type of relay 39 which in turn controls a motor 40. The relay 39 includes an operating or energizing coil 41 and a neutralizing or bucking coil 42, both of which co-operate in the control of an associated armature 43. The armature 43 controls switch arms 44 and 45 which respectively cooperate with associated contacts 46 and 47.

High voltage power is supplied by suitable line wires 48 and 49 and low voltage power is supplied by a step-down transformer 50 that is provided with a high voltage primary 51 and a low voltage secondary 52. The relay coils 15 and 16, in series, are connected across the secondary 52 by wires 53, 54, 55, 56 and 57. The compensating resistance 38 and the control resistance 28 are connected in parallel by wires 58 and 59 and these parallel connected resistances are connected in parallel with the series connected relay coils 15 and 16, through protective resistances 60 and 61, by means of wires 62, 63, 64 and 65.

The junction of relay coils 15 and 16 is connected to the center of corrector resistance 30 by wires 66 and 67 and is also connected to the compensating contact 34, through a resistance 68, by wires 69 and 70.

*Operating of the system of Fig. 1*

First, assuming that the control resistance 28 is the only resistance connected across the series-connected relay coils 15 and 16, and further assuming that the wire 67 is directly connected to the control contact 27 instead of being connected thereto through the resistance 30, it will be evident that with control contact 27 engaging the center of control resistance 28, the voltage drops across relay coils 15 and 16 will be equal and switch arm 17 will be intermediate contacts 19 and 20, as shown. Now if control contact 27 is moved along control resistance 28 towards its left-hand end, the voltage drop across relay coil 15 will be decreased and the voltage drop across relay coil 16 will increase. As the control contact 27 continues to move along control resistance 28 towards its left-hand end, the voltage drop across relay coil 15 will continue to decrease and, similarly, the voltage drop across relay coil 16 will continue to increase. However, equal movements of control contact 27 across equal amounts of the control resistance 28 will not result in equal changes in the voltage drops across relay coils 15 and 16. As the control contact 27 approaches the left-hand end of control resistance 28, the rate of change of the voltage drops across relay coils 15 and 16 for movement of control contact 27 across a predetermined amount of resistance 28 increases. As a result, the energization of relay coil 15 decreases and the energization of relay coil 16 increases more rapidly as the control contact 27 approaches the left-hand end of control resistance 28. In a similar manner, movement of control contact 27 along control resistance 28 towards its right-hand end causes an increase in the voltage drop across the relay coil 15 and a decrease in the voltage drop across relay coil 16. Again, however, these changes in voltage drops are not uniform for movements of control contact 27 along equal portions of resistance 28, the change increasing as the control contact 27 approaches the extreme right-hand end of control resistance 28.

The function of corrector resistance 30 and corector contact 29 is to insert more and more resistance in the circuit which connects to the junction of relay coils 15 and 16 as the control contact 27 moves away from the center of control resistance 28 in either direction. The insertion of this extra resistance in this circuit serves to prevent this increase in the rate of change of the voltage drops across relay coils 15 and 16 as the control contact 27 moves in either direction from the center of control resistance 28 and, by proper selection of the values of the control resistance 28 and the corrector resistance 30 in relation to the impedance of the coils 15 and 16, the rate of voltage change across these coils 15 and 16 can be maintained substantially constant for movements of control contact 27 along equal amounts of control resistance 28, irrespective of whether the control contact 27 be at the center of control resistance 28 or near either end thereof.

The design of the balanced relay 10 is such that only a portion of the total range of movement of control contact 27 on control resistance 28, or in other words only a portion of the total differential of the controller 21, is necessary to cause sufficient change in the voltage drops across relay coils 15 and 16 to move switch arm 17 from a position in which it engages contact 20 to a position in which it engages contact 19. In other words, the operating differential of the controller 21 is considerably smaller than its total differential. In actual practice, only about five per cent of the movement of the control contact 27 is required to cause a complete switching action of the balanced relay 10 wherein switch arm 17 moves from engagement with contact 20 and into engagement with contact 19.

The function of the compensating control 31 is to select the particular part of the total differential of the controller 21 at which this controller will operate the balanced relay 10. With the parts in the position shown wherein compensator contact 34 is engaging the center of compensator resistance 38, it will be evident that the control 21 will operate the balanced relay 10 as the control contact 27 moves slightly back and forth near the center of control resistance 28. If the temperature to which the thermostat 35 responds should rise, however, compensator contact 34 moves along compensator resistance 38 towards its right-hand end which causes a lowering in the voltage drop across the relay coil 16 and an increase in the voltage drop across the relay coil 15. As a result, control contact 27 must move further along control resistance 28 towards its left-hand end as a result of a rise in temperature of the thermostatic bellows 24 in order to balance the voltage drops across the relay coils 15 and 16 so as to bring the controller 21 into control of the switching mechanism comprised by switch arm 17 and the contacts 19 and 20. In this manner, a rise in temperature at the compensator 31 results in a raising of the control point of the controller 21. Similarly, a fall in the temperature at the compensator 31 decreases the voltage drop across the relay coil 15 and increases the voltage drop across the relay coil 16. The control contact 27 must then move to the right of its center position and towards the right-hand end of control resistance 28 in order to operate the switching mechanism 17—19—20. In this manner, changes in the temperature to which the bellows 35 is subjected causes a shifting of the temperature at which the controller 21 will control the switching mechanism 17—19—20. The provision of resistance 68 is for the purpose of limiting the effect of compensator 31 upon the controller 21 in such manner that even though the compensator 31 moves to either of its extreme positions, the controller 21 can still operate switching mechanism 17—19—20 from one of its positions to the other of its positions Now, assuming that the controller 21 responds to the temperature of a space to be controlled and has a total differential of 10° ranging from 75° F. to 85° F., and that the compensator 31 responds to outdoor temperatures and has a total differential of 25° ranging from 75° F. to 100° F. With the parts in the position shown, the outdoor temperature is substantially 87.5° F., and the inside, or space temperature, is substantially 80° F. With the parts in the position shown, the motor 40, which may be a compressor motor, is energized to reduce the temperature of the room or space by a circuit as follows: Line wire 49, wire 75, switch arm 45, contact 47, wire 76, compressor motor 40 and wire 77 to line wire 48. Operation of compressor motor 14 will lower the temperature of the room or space. Control contact 27 will therefore move along control resistance 28 towards its right-hand end. This results in a lowering of the voltage drop across the relay coil 16 and an increase in the voltage drop across the relay coil 15. Armature 11 then rotates in clockwise direction and switch arm 17 moves towards contact 19. When the switch arm 17 engages contact 19, the energizing coil 41 of the relay 39 is energized by a circuit as follows: Secondary 52, wire 57, wire 56, wire 78, contact 19, switch arm 17, wire 79, energizing coil 41, wire 80, wire 81, and wire 53 to the other side of secondary 52. Energization of energizing coil 41 attracts armature 43 and moves switch arm 44 into engagement with contact 46 and switch arm 45 moves out of engagement with contact 47. Movement of switch arm 45 from engagement with contact 47 interrupts the energizing circuit for compressor motor 40. Engagement of switch arm 44 with contact 46 establishes a holding circuit for energizing coil 41 which is independent of the switch arm 17 and the contact 19. This holding circuit is as follows: Secondary 52, wire 57, wire 82, switch arm 44, contact 46, wire 83, energizing coil 41, wire 80, wire 81, and wire 53 to the other side of secondary 52. The armature 43 therefore remains in its attracted position even after switch arm 17 engages discontact 19.

With the compressor motor 40 now deenergized, the temperature of the room or space will soon begin to increase. Such increase in the space temperature is accompanied by movement of control contact 27 along control resistance 28 towards its left-hand end. This causes a decrease in the voltage drop across relay coil 15 and an increase in the voltage drop across the relay coil 16 so that armature 11 rotates in a counter-clockwise direction. When this rise in room temperature has been sufficient, the switch arm 17 will engage contact 20 whereupon an energizing circuit for the neutralizing coil 42 is established as follows: Secondary 52, wire 57, wire 82, switch arm 44, contact 46, wire 83, wire 79, switch arm 17, contact 20, wire 84, neutralizing coil 42, wire 81, and wire 53 to the other side of secondary 52. Such energization of the neutralizing coil 42 creates a magnetic flux equal to and opposing that produced by the energizing coil 41 whereupon there is no longer any attractive force operating upon armature 43 and the same returns to the position shown in Fig. 1 of the drawings by gravity. This causes separation of switch arm 44 from contact 46 and movement of switch arm 45 into engagement with contact 47. Separation of switch arm 44 and contact 46 not only interrupts the holding circuit for energizing coil 41 but interrupts the energizing circuit for neutralizing coil 42 so that there is still no attractive force operating on armature 43 and the same will remain in its new position. Engagement of switch arm 45 with contact 47 energizes compressor motor 40 by the circuit traced above whereupon the room or space being controlled is again cooled. The relay 39 will then remain in the position shown until the temperature of the room or space has again decreased sufficiently to move switch arm 17 engagement with contact 19 whereupon the above described operation will be repeated.

In this manner, for any given outdoor temperature, the controller will operate the balanced relay 10 upon a predetermined operating differential or small change in space temperature to start and stop the compressor motor 40 to maintain the room or space temperature within such predetermined narrow range of temperature. Upon a change in the outdoor temperature, the operating range of the controller 21 will be shifted to a new temperature as pointed out above. As previously pointed out, movement of compensator contact 34 towards the left end of compensating resistance 38 operates to reduce the voltage drop across the relay coil 15. As a result, the room temperature must fall to a lower degree before the voltage drop across relay coil 15 will be increased over the voltage drop across the relay coil 16 sufficient to cause movement of switch arm 17 into engagement with contact 19. In this manner, as the outdoor temperature drops, the temperature which is maintained within the room or space is also lowered. Similarly, a rise in outdoor temperature will be accompanied by a raising of the control point of the controller 21 so that a higher temperature within the space will be maintained. By selecting the range of the controller 21 at a 10° differential and the range of the compensator 31 at a 25° differential, it will be apparent that the temperature maintained in the room or space being controlled will be raised at a slower rate than the outdoor temperature rise whereby a variable differential is maintained between the indoor and outdoor temperatures. By reason of the provision of resistance 68, the controller 21 will still be operative to move the switch arm 17 into engagement with either of the contacts 19 or 20 even though the compensator 31 goes to either of its extreme positions. In addition, the provision of the corrector resistance 30 provides for equal operating differentials of the controller 21 in controlling the switching mechanism 17—19—20, irrespective of whether the control point of the controller 21 be near its low, its middle or its high end.

Now referring to Fig. 2 of the drawings, it will be seen that the system of Fig. 2 corresponds to the system of Fig. 1 except that two compensators are utilized instead of a single compensator. Those parts of Fig. 2 which correspond with similar parts of Fig. 1 have applied thereto the same reference characters as utilized in Fig. 1.

The additional compensator comprises an apparatus generally indicated at 85 and includes a bell-crank 86 having arms 87 and 88. A humidity responsive element 89, herein shown as formed of a plurality of strands of hair, has one of its ends secured to the arm 87 and its other end secured to a suitable support 90. A tension spring 91 has one of its ends secured to the arm 87 and its other end secured to a suitable support 92 and serves to maintain the humidity responsive element 89 under proper tension. The arm 88 is a compensator contact and it cooperates with a compensator resistance 93, the arrangement being such that compensator contact 88 moves along compensator resistance 93 towards its left-hand end upon an increase in the value of the relative humidity to which the humidity responsive element 89 responds. This compensating resistance 93 is connected in parallel with the compensating resistance 38, as well as in parallel with the control resistance 28, by means of the wires 58 and 59 and two additional wires 94 and 95. The compensator contact 88 is connected to the junction of relay coils 15 and 16 through a resistance 96 by wires 97, 98, 69 and 66. It will therefore be evident that the compensator 85 is connected to the system in the same manner as the compensator 31.

In the system of Fig. 2 therefore, the control point of the controller 21 is not only shifted by reason of the compensator 31 but also by reason of the compensator 85. If this compensator 85 is made to respond to the relative humidity of the room or space being controlled and is connected into the system in the manner shown, then an increase in the relative humidity of the space being controlled causes a decrease in the voltage drop across the relay coil 15 and an increase in the voltage drop across the relay coil 16 wherefore the temperature of the space must be lowered in order to cause movement of switch arm 17 into engagement with contact 19 so as to bring about a stopping of the compressor motor 40. Similarly, upon a decrease in the relative humidity of the space, the compensator 85 raises the control point of controller 21 so that a higher temperature is maintained in the space. In this manner, a substantially constant effective temperture is maintained within the space for any given outdoor temperature and the effective temperature is raised as the outdoor temperature rises, but at a slower rate, whereby a variable differential is maintained between the outdoor dry bulb temperature and the indoor effective temperature. In the system of Fig. 2, the resistance 96 which is associated with the compensator contact 88 permits dominating control by the controller 21 even though the compensator 85 moves to either of its extreme positions. In view of the explanation of the system of Fig. 1, it is thought that the detailed manner in which the system of Fig. 2 operates will now be apparent.

Turning now to Fig. 3 of the drawings, a "graduated" system of compensating control is shown in distinction to the "on and off" systems of compensated control shown in Figs. 1 and 2. The system of Fig. 3 includes a balanced relay designated generally at 100 which includes an armature 101 that is pivoted at 102. The armature 101 is provided with legs 103 and 104 with which relay coils 105 and 106 respectively cooperate. Auxiliary windings 107 and 108 of relatively small power also cooperate with the respective legs 103 and 104. The armature 101 controls a switch arm 109, the switch arm 109 being connected to the armature 101 through the medium of a piece of insulating material 110. This switch arm 109 is disposed between a pair of cooperating contacts 111 and 112 so that the switch comprised by the switch arm 109 and contacts 111 and 112 comprises a single pole, double throw switch.

The energizations of relay coils 105 and 106 are adapted to be maintained substantially constant at all times by means which will be described hereinafter. Unbalancing of the energizations of the relay coils 105 and 106 is accomplished by means of a controller and two compensators which correspond in their details to the controller 21 and compensators 31 and 85 of the system of Fig. 2 wherefore the reference characters of Fig. 2 applying to the controller and compensators have been applied to the controller and compensators of Fig. 3.

Low voltage power is supplied to the system of Fig. 3 by a step-down transformer 115 that is provided with a high voltage primary 116 and a low voltage secondary 117. The relay coils 105 and 106, in series, are connected across the secondary 117 by wires 118, 119, 120, 121, 122 and 123. The control resistance 28 and the corrector resistances 38 and 93 are all connected in parallel with each other and in parallel with the series connected relay coils 105 and 106 by wires 124, 125, 126, 127, 128 and 129. It will therefore be seen that all three of these resistances 28, 38 and 93 and the series-connected relay coils 105 and 106 are all connected in parallel with each other and across the secondary 117.

Rebalancing of the energizations of relay coils 105 and 106 is accomplished by a balancing potentiometer generally indicated at 130 which comprises a balancing resistance 131 and a balancing contact 132. This balancing resistance 131 is also connected across the secondary 117 by wires 118, 133, 134 and 123.

The junction of relay coils 105 and 106 is connected to the center of corrector resistance 30 and is further connected to the compensator contacts 88 and 34 and to the balancing contact 132 through suitable adjustable rheostats. Wires 135 and 136 comprise the connections between the junction of relay coils 105 and 106 and the center of corrector resistance 30. The circuit from the junction of relay coils 105 and 106 to the compensator contacts 88 and 34 is as follows: Wire 135 and wire 137, where the circuit branches, one part going by wire 138, a rheostat 159, and a wire 140 to the compensator contact 88, whereas the other portion goes by way of wire 141, a rheostat 142, and a wire 143 to the compensator contact 34. The junction of relay coils 105 and 106 is connected to the balancing contact 132 through a rheostat 144 by wire 135 and wires 145 and 146.

The balancing potentiometer 130 is controlled by the final or main operating shaft 150 of a motor mechanism generally indicated at 151. In the specific example shown, the balancing contact 132 is connected to this main operating shaft 150. The main operating shaft is connected to a rotor shaft 152 by means of suitable reduction gearing 153. Secured to rotor shaft 152 is a pair of motor rotors 154 and 155 which respectively cooperate with field windings 156 and 157. The main operating shaft 150 may control any desired type of apparatus or mechanism and is herein shown as controlling a valve 158 which may, for example, control the flow of cooling medium to a suitable cooling coil. The connections between the valve 158 and the main operating shaft 150 comprise a pinion 159 secured to the main operating shaft 150, this pinion 159 in turn cooperating with a rack 160 that is secured to the valve stem 161 of the valve 158.

*Operation of the system of Fig. 3*

With the parts in the position shown, the control contact 27, the compensator contacts 88 and 34 and the balancing contact 132 are all engaging the centers of their respective resistances 28, 93, 38 and 131 and the corrector contact 29 is engaging the center of corrector resistance 30 to which the wire 136 is connected so that no part of the corrector resistance 30 is in the circuit. Under these conditions, the relay coils 105 and 106 are equally energized and the switch arm 109 is intermediate the contacts 111 and 112.

Assuming that the controller 21 responds to the temperature of a space to be controlled and that the compensator 85 responds to the relative humidity of such space whereas the compensator 31 responds to outdoor temperatures, all as explained in connection with Fig. 2, then, with the parts in the position shown, the valve 158 is half-open and just sufficient cooling fluid is being allowed to flow to the cooling apparatus to maintain the temperature of the space constant. If the space temperature should rise somewhat so that control contact 27 moves along control resistance 28 towards its left-hand end, then the voltage drop across the relay coil 105 decreases and the voltage drop across the relay coil 106 increases. This causes counter-clockwise rotation of armature 101 and movement of switch arm 109 towards contact 111. When the temperature rise is sufficient to bring switch arm 109 into engagement with contact 111, field winding 157 and the auxiliary winding 108, in series, are energized by a circuit as follows: Secondary 117, wire 118, wire 119, wire 165, switch arm 109, contact 111, wire 166, auxiliary winding 108, wire 167, a limit switch 168, wire 169, field winding 157, wire 170, wire 122, and wire 123 to the other side of secondary 117. Energization of the auxiliary winding 108 causes an additional attractive force to be applied to armature 101, tending to rotate the same in counter-clockwise direction, so that switch arm 109 is held firmly in engagement with contact 111. Energization of field winding 157 causes rotation of main operating shaft 150 in a clockwise direction as viewed from the left so that the rack 160 is raised to open the valve 158 more widely and the balancing contact 132 moves upwardly along balancing resistance 131. Such movement of balancing contact 132 along the balancing resistance 131 reduces the voltage drop across the relay coil 106 and increases the voltage drop across the relay coil 105. This causes clockwise movement of armature 101 or tends to cause such movement and when this rotative force is great enough, switch arm 109 disengages contact 111. When this occurs, the auxiliary winding 108 and the field winding 157 are both deenergized whereupon further rotation of main operating shaft 150 ceases. This deenergization of auxiliary winding 108 removes the additional attractive force on armature 101, tending to rotate the same in counter-clockwise direction, whereupon the same rotates a small amount further in clockwise direction so as to move switch arm 109 a substantial distance from contact 111. The valve 158 has now been moved to a more wide open position such as should be sufficient to maintain the space temperature at its new value.

On the other hand, if the space temperature should fall, control contact 27 will move along control resistance 28 towards its right-hand end whereby the voltage drop across relay coil 106 will be lowered and the voltage drop across relay coil 105 will be increased. Armature 101 therefore rotates in a clockwise direction and switch arm 109 moves towards contact 112. When this fall in space temperature has been sufficient, switch arm 109 engages contact 112 whereupon auxiliary winding 107 and field winding 156, in series, are energized as follows: Secondary 117, wire 118, wire 119, wire 165, switch arm 109, wire 112, wire 171, auxiliary winding 107, wire 172, a limit switch 173, wire 174, field winding 156, wire 170, wire 122 and wire 123 to the other side of secondary 117. Main operating shaft 150 is now rotated in a counter-clockwise direction as viewed from the left whereupon rack 150 moves downwardly to partially close the valve 158 and the balancing contact 132 moves downwardly along balancing resistance 131. Energization of the auxiliary winding 107 causes a further attractive force on armature 101 tending to move switch arm 109 towards contact 112 whereby a good firm contact is maintained between these parts. Movement of balancing contact 132 downwardly along balancing resistance 131 reduces the voltage drop across relay coil 105 and increases the voltage drop across relay coil 106. When the voltage drops across these relay coils have thus been changed sufficiently, switch arm 109 disengages contact 112 to interrupt the circuit through auxiliary winding 107 and field winding 156. Further rotation of main operating shaft 150 thereupon ceases. Deenergization of the auxiliary winding 107 permits further movement of switch arm 109 away from contact 112 to insure a good clean break. The valve 158 has now been closed somewhat to reduce the supply of cooling medium to the room or space being controlled whereby the temperature thereof should not lower any further.

In this manner, so long as the relative humidity of the space being controlled and so long as the outdoor temperature both remain constant, the controller 21 operates to variably position valve 158 to maintain the temperature of the space within a portion of the total range of operation of the controller 21. The fluctuation in room temperature will be relatively small and with the parts in the position shown, the temperature of the room or space will be maintained at substantially 80° F. The provision of the corrector contact 29 and corrector resistance 30 provide for equal movements of valve 158 for equal movements of control contact 27 irrespective of the position in respect to control resistance 28 as pointed out in connection with the systems of Figs. 1 and 2.

If the relative humidity of the space should now increase, compensator contact 88 will move along compensator resistance 93 towards its left-hand end whereupon the voltage drop across relay coil 105 will be reduced and the voltage drop across relay coil 106 will be increased. As a result, for any given position of control contact 27, the balancing contact 132 must move further towards the upper end of balancing resistance 131 in order to maintain the energizations of relay coils 105 and 106 sufficiently equal to maintain switch arm 109 intermediate contacts 111 and 112. Therefore, as the relative humidity in the space increases, more cooling fluid will pass to the cooling apparatus for any given temperature within the space whereby the temperature of the space maintained by the controller 21 will tend to lower. In this manner, the control or operating range of controller 21 is shifted upon changes in the space relative humidity whereby the effective temperature is maintained substantially constant. The opposite action takes place, of course, on a lowering in the relative humidity in the space.

In a similar manner, a decrease in the outdoor temperature also reduces the voltage drop across relay 105 and increases the voltage drop across relay coil 106 so that balancing contact 132 again must move upwardly along balancing resistance 131 to a greater extent for any given position of the controller 21 and compensator 85 whereby more cooling will be effected. This likewise tends to reduce the temperature maintained in the space, the opposite action taking place upon a rise in outdoor temperature. In this manner, a substantially constant effective temperature is maintained in the space by permitting the relative humidity to vary as it may and varying the dry bulb temperature thereof. In addition, the standard of effective temperature maintained in the space is raised as the outdoor temperature rises but at a slower rate so that a variable differential is maintained between the outside dry bulb temperature and the inside effective temperature.

The rheostat 144, which is in circuit with the balancing contact 132, provides for extra resistance in the balancing circuit for relay coils 105 and 106 so that a larger movement of the balancing contact 132 is required to rebalance the energizations of relay coils 105 and 106 than the movement of control contact 27 which causes such unbalance. As a result, the operating differential of the controller 21 can be made less than its total differential and the value of this operating differential will depend upon the adjustment of rheostat 144. The rheostats 139 and 142, which are in circuit with the compensators 85 and 31, prevent complete short-circuiting of either of the relay coils 105 and 106 by either of these compensators and makes it possible for the controller 21 to have dominating control of the apparatus even though one or both of the compensators go to either of its extreme positions. As stated before, the corrector resistance 30 operates to maintain the operating differential of the controller 21 substantially constant irrespective of whether this controller be operating near the center or near either end. The limit switches 168 and 173 can be actuated in any of the usual manners by the movements of the motor mechanism 151 so as to limit the extreme movements of main operating shaft 150 in either direction.

While compensation of the indoor temperature maintained within a space to be controlled has been disclosed wherein the indoor temperature is raised as the outdoor temperature rises, but at a slower rate, so as to give a variable differential between indoor and outdoor temperature and while some of the systems additionally provide for compensation according to changes of relative humidity in the space, it is to be understood that the systems disclosed herein are of general utility wherever it is desired to compensate the value of one condition which is maintained by a control mechanism in accordance with changes in another condition. For instance, if it were desired to raise the temperature of water in a boiler as the outdoor temperature decreased, the controller 21 of Fig. 1 would be made to respond to boiler water temperature and the compensator 31 would be made to respond to outdoor temperature. The end connections of the compensating resistance 38 would then be reversed from what is shown in Fig. 1 so that the control point of the controller 21 would be raised as the outdoor temperature decreased. It would also, of course, be necessary to select controllers and compensators having the proper total ranges or differentials in order to give the type of compensation desired.

As a practical example, the control resistance 28, the compensating resistance 38, the compensating resistance 39 and the balancing resistance 131 each have a resistance of 135 ohms. The total resistance of corrector resistance 30 is 70 ohms, one-half of this resistance being on each side of the wire which is connected to its center. The value of the protective resistances 60 and 61 utilized in the systems of Figs. 1 and 2 is 25 ohms each. The value of the resistance 68 of Fig. 1 is 45 ohms. However, where two compensators are used, as in the system of Fig. 2, the value of the resistances 68 and 96 is 90 ohms each. The rheostats 139, 142 and 144 utilized in the system of Fig. 3 may be adjusted from a minimum of 25 ohms to a maximum of 300 ohms. This minimum adjustment prevents complete short-circuiting of either of relay coils 105 or 106 upon extreme movements of balancing contact 132, or extreme movements of either compensator. The combined impedance of the series-connected relay coils 105 and 106 is approximately 105 ohms where the current supply has a frequency of 60 cycles. The low voltage secondary 117 is 20 volts.

In adapting any of the systems of Figs. 1, 2 and 3 to any desired type of compensating control, the values of the various controlling and compensating resistances are always maintained equal and the instrument is so constructed as to cause the contact thereof to completely traverse such controlling or compensating resistance upon the desired change in the particular condition or conditions being used to control and compensate. It will be obvious that many minor modifications may be made in these systems without departing from the novel features of the present invention, and I am to be limited therefore only in accordance with the scope of the appended claims.

I claim as my invention:

1. In an electrical control system, in combination, a pair of normally equally energized series connected electrical coils, a control potentiometer having a control resistance and a control contact movable in respect to each other, connections connecting said control resistance in parallel with said series connected coils and said control contact intermediate said coils, means to vary the positions of said control resistance and control contact in respect to each other, current varying means controlled by said position varying means operable to insert resistance between said control contact and the junction of said coils whenever the control contact is not engaging the center of said control resistance, and a device to be controlled operated by said electrical coils.

2. In an electrical control system, in combination, a pair of normally equally energized series connected electrical coils, a control potentiometer having a control resistance and a control contact movable in respect to each other, connections connecting said control resistance in parallel with said series connected coils and said control contact intermediate said coils, means to vary the positions of said control resistance and control contact in respect to each other, current varying means controlled by said position varying means operable to insert resistance between said control contact and the junction of said coils whenever the control contact is not engaging the center of said control resistance, a device to be controlled operated by said electrical coils, and adjustable resistance means electrically connected to said control potentiometer and said coils operative upon adjustment to vary the effect of said control potentiometer upon said coils.

3. In an electrical control system, in combination, a pair of normally equally energized series connected electrical coils, a control potentiometer having a control resistance and a control contact movable in respect to each other, connections connecting said control resistance in parallel with said series connected coils and said control contact intermediate said coils, means to vary the positions of said control resistance and control contact in respect to each other, current varying means controlled by said position varying means operable to insert resistance between said control contact and the junction of said coils whenever the control contact is not engaging the center of said control resistance, a device to be controlled operated by said electrical coils, a compensating potentiometer comprising a compensating resistance and a compensating control movable in respect to each other, electrical connections connecting said compensating potentiometer in parallel with said control potentiometer, a resistance, and connections connecting said compensating contact to the junction of said coils through said resistance.

4. In an electrical control system, in combination, a pair of normally equally energized series connected electrical coils, a control potentiometer having a control resistance and a control contact movable in respect to each other, connections connecting said control resistance in parallel with said series connected coils and said control contact intermediate said coils, means to vary the positions of said control resistance and control contact in respect to each other whereby to vary the respective energizations of said series connected coils, current varying means controlled by said position varying means operable to insert resistance between said control contact and the junction of said coils whenever the control contact is not engaging the center of said control resistance, motor means controlled by said coils, a device to be positioned operated by said motor means, and a balancing potentiometer electrically connected to said series connected coils operated by said motor means in a manner to maintain the energizations of said series connected coils substantially equal.

5. In an electrical control system, in combination, a pair of normally equally energized series connected electrical coils, a control potentiometer having a control resistance and a control contact movable in respect to each other, connections connecting said control resistance in parallel with said series connected coils and said control contact intermediate said coils, means to vary the positions of said control resistance and control contact in respect to each other, current varying means controlled by said position varying means operable to insert resistance between said control contact and the junction of said coils whenever the control contact is not engaging the center of said control resistance, a balancing potentiometer comprising a balancing resistance and a balancing contact, a device to be positioned, motor means controlled by said coils in control of said balancing potentiometer and device, connections connecting the balancing resistance in parallel with said control resistance, a resistance, and connections connecting said balancing contact to the junction of said coils through said resistance.

6. In an electrical control system, in combination, a pair of electrical coils connected in series across a source of power, a control potentiometer and a balancing potentiometer connected in parallel with said series conected coils and each having substantially equal resistance, connections between the junction of said coils and the contacts of said potentiometers, a variable resistance having a minimum setting in the connection between said junction and the contact of the balancing potentiometer, said minimum setting of the variable resistance preventing complete short-circuiting of either coil upon extreme positions of said balancing potentiometer and the resistance also determining the amount of movement of said control potentiometer required to cause a complete extreme position of said balancing potentiometer to substantially rebalance the energizations of said coils, a device to be positioned, means controlled by said coils to operate said balancing potentiometer and position said device, and variable resistance means operable to increase its resistance upon movement of the control potentiometer out of its center position in either direction by said operating means, said variable resistance means being included in the circuit between the contact of said control potentiometer and the junction of said coils.

7. In an electrical control system, in combination, a pair of electromagnetic coils connected in series across a source of power, switching means controlled by said coils upon a predetermined change in their respective energizations, means to be controlled operated by said switching means, a control potentiometer including a control resistance connected in parallel with said series connected coils and a control contact connected to the junction of said coils, said control potentiometer being capable of changing the respective energizations of said coils more than said predetermined change required to cause operation of said switching means, adjustable means associated with said potentiometer to determine the portion of its range of movement which will cause said predetermined change in the energizations of said coils, and means operable with said potentiometer to require substantially equal movements thereof throughout its range of movement to result in said predetermined change in the energization of said coils.

8. A temperature control system of the class described, comprising, in combination, means to change the temperature of a space, means in control of said temperature changing means including a pair of electromagnetic coils connected in series across a source of power, a controller responsive to space temperature and having a range of response within which it is desired to vary the space temperature upon fluctuations in outdoor temperature, said controller comprising a resistance and a cooperating contact movable in respect to each other upon change in the space temperature, an outdoor temperature responsive controller having a range of response equal to the range of outdoor temperatures for which it is desired to vary the space temperature, said second controller comprising a resistance and a cooperating contact movable in respect to each other, electrical connections connecting one end of each resistance to one end of the series connected coils and connecting the other ends of said resistances to the other end of said series connected coils, a third resistance, connections connecting the movable contact of said second controller intermediate the series connected coils through said third resistance, a fourth resistance having an intermediate point connected intermediate said series connected coils, and a contact operated by said first controller which engages said intermediate point of the fourth resistance only when the movable contact of the first controller engages the center of its associated resistance.

9. In an electrical compensated control system, in combination, motor means movable in two directions for performing a control function, a pair of normally balanced electrical coils connected in series across a source of power, means controlled by said series connected coils upon unbalancing thereof for causing movement of the motor means in one direction or the other depending upon the direction of unbalance of the series connected coils, a control potentiometer including a control resistance and a control contact, means for relatively adjusting the control contact with respect to the control resistance throughout a complete range of adjustment, a balancing potentiometer including a balancing resistance and a balancing contact, means operated by said motor means for relatively adjusting the balancing contact with respect to the balancing resistance in accordance with the direction and extent of movement of the motor means, connections for connecting the control resistance and the balancing resistance in parallel to the series connected coils and the control contact and the balancing contact to the junction of the series connected coils whereby the motor means is moved in accordance with the adjustment of the control potentiometer, resistance means located in the connections between the balancing potentiometer and the series connected coils for desensitizing the controlling action of the balancing potentiometer whereby the motor means may be moved to either extreme position upon adjustment of the control potentiometer through a relatively small operative range of adjustment within the complete range of adjustment, a compensating potentiometer including a compensating resistance and a compensating contact, means for relatively adjusting the compensating contact with respect to the compensating resistance, connections for connecting the compensating resistance in parallel with the series connected coils and the compensating contact to the junction of the series connected coils whereby the motor means is also moved in accordance with the adjustment of the compensating potentiometer, and resistance means located in said last mentioned connections for always allowing the control potentiometer to control the current flow through the coils even though the compensating potentiometer is adjusted to an extreme position and for desensitizing the controlling action of the compensating potentiometer whereby the relatively small operative range of adjustment of the control potentiometer is shifted within the complete range of adjustment thereof in accordance with the adjustment of the compensating potentiometer.

10. In an electrical compensated control system, in combination, motor means movable in two directions for performing a control function, a pair of normally balanced electrical coils connected in series across a source of power, means controlled by said series connected coils upon unbalancing thereof for causing movement of the motor means in one direction or the other depending upon the direction of unbalance of the series connected coils, a control potentiometer including a control resistance and a control contact, means for relatively adjusting the control contact with respect to the control resistance throughout a complete range of adjustment, a balancing potentiometer including a balancing resistance and a balancing contact, means operated by said motor means for relatively adjusting the balancing contact with respect to the balancing resistance in accordance with the direction and extent of movement of the motor means, connections for connecting the control resistance and the balancing resistance in parallel to the series connected coils and the control contact and the balancing contact to the junction of the series connected coils whereby the motor means is moved in accordance with the adjustment of the control potentiometer, resistance means located in the connections between the balancing potentiometer and the series connected coils for desensitizing the controlling action of the balancing potentiometer whereby the motor means may be moved to either extreme position upon adjustment of the control potentiometer through a relatively small operative range of adjustment within the complete range of adjustment, a compensating potentiometer including a compensating resistance and a compensating contact, means for relatively adjusting the compensating contact with respect to the compensating resistance, connections for connecting the compensating resistance in parallel with the series connected coils and the compensating contact to the junction of the series connected coils whereby the motor means is also moved in accordance with the adjustment of the compensating potentiometer, resistance means located in said last mentioned connections for always allowing the control potentiometer to control the current flow through the coils even though the compensating potentiometer is adjusted to an extreme position and for desensitizing the controlling action of the compensating potentiometer whereby the relatively small operative range of adjustment of the control potentiometer is shifted within the complete range of adjustment thereof in accordance with the adjustment of the compensating potentiometer, and means for adding and subtracting resistance in the connection between the control contact and the junction of the series connected coils upon adjustment of the control potentiometer to maintain the relatively small operative range of adjustment thereof substantially constant.

11. In an electrical compensated control system, in combination, a pair of normally balanced electrical coils connected in series across a source of power, mechanism controlled by said normally balanced series connected coils and placed in operation upon a predetermined unbalance in one direction and out of operation upon a predetermined unbalance in the opposite direction, a control potentiometer including control resistance and a control contact, means for relatively adjusting the control contact with respect to the control resistance throughout a complete range of adjustment, connections for connecting the control resistance in parallel with the series connected coils and the control contact to the junction of the series connected coils, the arrangement being such that the series connected coils are unbalanced in one direction to place the mechanism in operation and are unbalanced in the opposite direction to place the mechanism out of operation upon adjustment of the control potentiometer through a relatively small operative range of adjustment within the complete range of adjustment, a compensating potentiometer including a compensating resistance and a compensating contact, connections for connecting the compensating resistance in parallel with the series connected coils and the compensating contact to the junction of the series connected coils whereby the series connected coils are also controlled by the compensating potentiometer, and resistance means included in said last mentioned connections for always allowing the control potentiometer to control the current flow through the coils even though the compensating potentiometer is adjusted to an extreme position and for desensitizing the controlling action of the compensating potentiometer whereby the relatively small operative range of adjustment of the control potentiometer is shifted within the complete range of adjustment thereof in accordance with the adjustment of the compensating potentiometer.

12. In an electrical compensated control system, in combination, a pair of normally balanced electrical coils connected in series across a source of power, mechanism controlled by said normally balanced series connected coils and placed in operation upon a predetermined unbalance in one direction and out of operation upon a predetermined unbalance in the opposite direction, a control potentiometer including control resistance and a control contact, means for relatively adjusting the control contact with respect to the control resistance throughout a complete range of adjustment, connections for connecting the control resistance in parallel with the series connected coils and the control contact to the junction of the series connected coils, the arrangement being such that the series connected coils are unbalanced in one direction to place the mechanism in operation and are unbalanced in the opposite direction to place the mechanism out of operation upon adjustment of the control potentiometer through a relatively small operative range of adjustment within the complete range of adjustment, a compensating potentiometer including a compensating resistance and a compensating contact, connections for connecting the compensating resistance in parallel with the series connected coils and the compensating contact to the junction of the series connected coils whereby the series connected coils are also controlled by the compensating potentiometer, resistance means included in said last mentioned connections for always allowing the control potentiometer to control the current flow through the coils even though the compensating potentiometer is adjusted to an extreme position and for desensitizing the controlling action of the compensating potentiometer whereby the relatively small operative range of adjustment of the control potentiometer is shifted within the complete range of adjustment thereof in accordance with the adjustment of the compensating potentiometer, and means for adding and subtracting resistance in the connection between the control contact and the junction of the series connected coils upon adjustment of the control potentiometer to maintain the relatively small operative range of adjustment thereof substantially constant.

13. A temperature control system for a space, comprising, in combination, means to change the temperature of a space, means including electrical means in control of the temperature changing means, a control potentiometer, means responsive to space temperature for adjusting the control potentiometer through a complete range of adjustment in accordance with permissible variations in space temperature, means including connections between the electrical means and the control potentiometer to control the temperature changing means upon adjustment of the control potentiometer through a relatively small operative range of adjustment within the complete range of adjustment thereof, a compensating potentiometer, means responsive to space relative humidity for adjusting the compensating potentiometer in accordance with variations in space relative humidity, connections between the compensating potentiometer and the electrical means whereby the temperature changing means is also controlled by space relative humidity, and resistance means associated with said compensating potentiometer for always allowing the control potentiometer to control said electrical means and for desensitizing the controlling action of the compensating potentiometer whereby the relatively small operative range of adjustment of the control potentiometer is shifted within the complete range of adjustment thereof in accordance with the adjustment of the compensating potentiometer to maintain desired temperatures within the space that vary in accordance with changes in space relative humidity.

14. A temperature control system for a space, comprising, in combination, means to change the temperature of a space, means including electrical means in control of the temperature changing means, a control potentiometer, means responsive to space temperature for adjusting the control potentiometer through a complete range of adjustment in accordance with permissible variations in space temperature, means including connections between the electrical means and the control potentiometer to control the temperature changing means upon adjustment of the control potentiometer through a relatively small operative range of adjustment within the complete range of adjustment thereof, a compensating potentiometer, means responsive to outside temperature for adjusting the compensating potentiometer in accordance with variations in outside temperature, connections between the compensating potentiometer and the electrical means whereby the temperature changing means is also controlled by outside temperature, and resistance means associated with said compensating potentiometer for always allowing the control potentiometer to control said electrical means and for desensitizing the controlling action of the compensating potentiometer whereby the relatively small operative range of adjustment of the control potentiometer is shifted within the complete range of adjustment thereof in accordance with the adjustment of the compensating potentiometer to maintain desired temperatures within the space that vary in accordance with changes in outside temperatue.

JOHN E. HAINES.